UNITED STATES PATENT OFFICE.

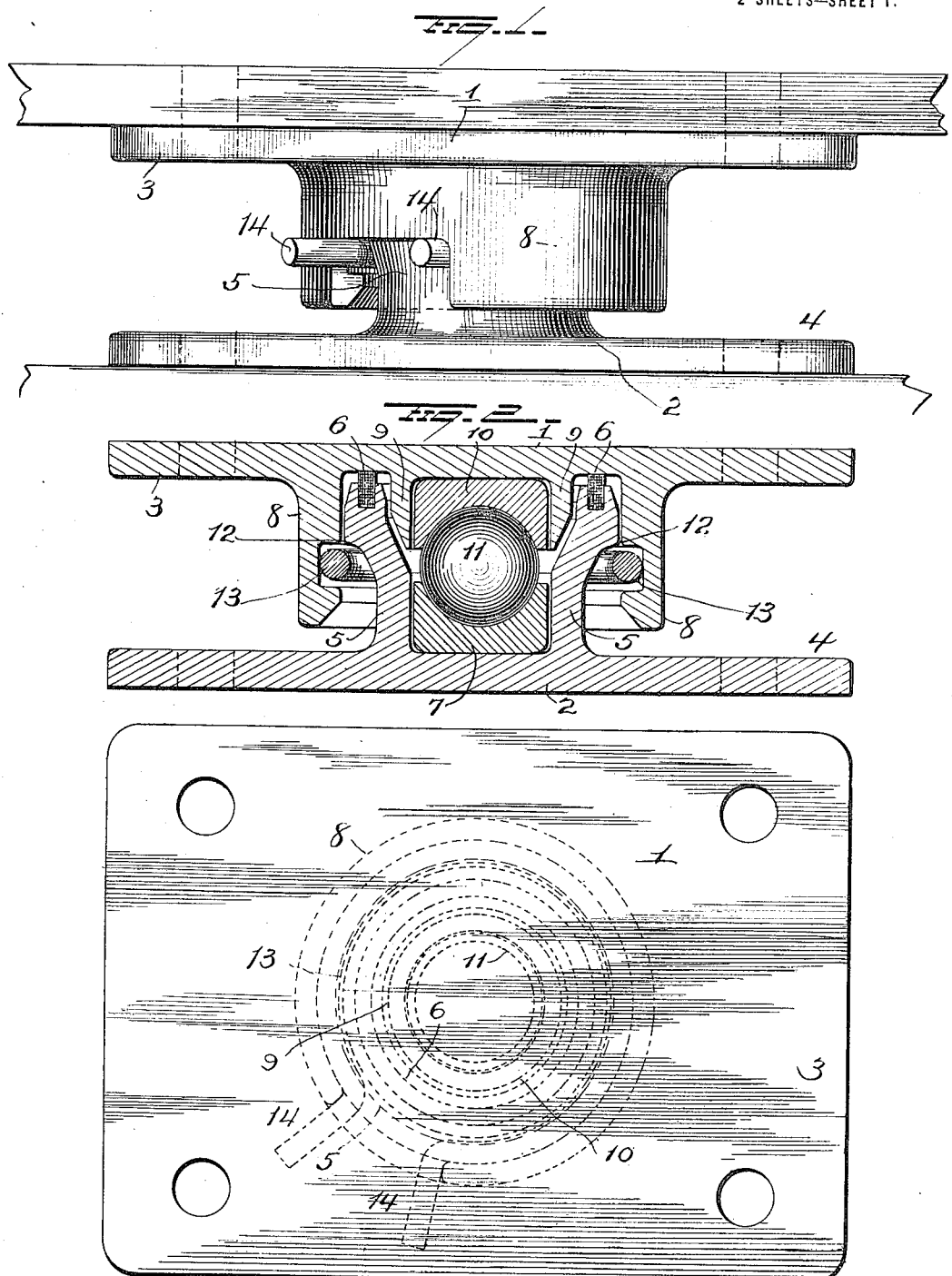

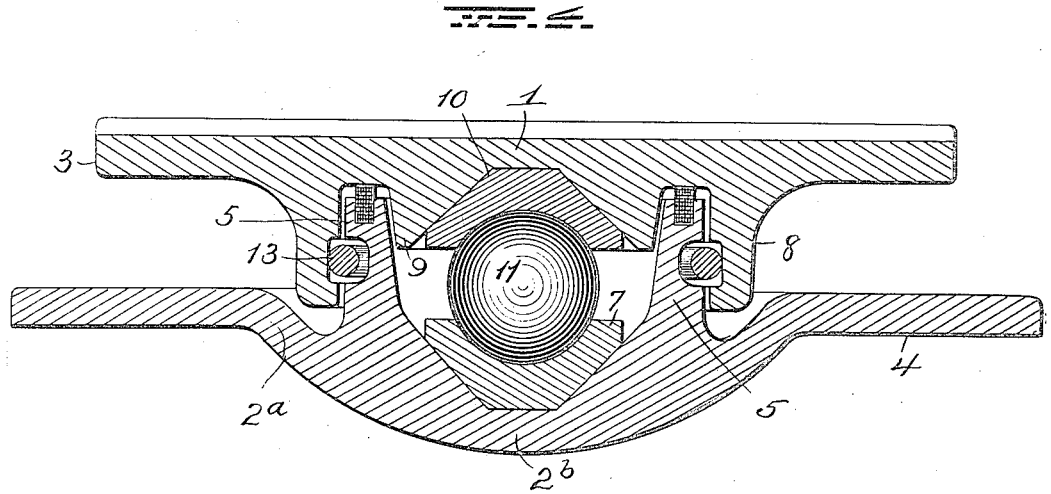

THOMAS ELLIOTT, OF CINCINNATI, OHIO, AND WILLIAM E. MOORE, OF PITTSBURGH, PENNSYLVANIA.

CENTER-BEARING FOR CARS 1,144,644.      Specification of Letters Patent.      Patented June 29, 1915.

Application filed March 21, 1914. Serial No. 826,145.

*To all whom it may concern:*

Be it known that we, THOMAS ELLIOTT and WILLIAM E. MOORE, of Cincinnati, in the county of Hamilton and State of Ohio, and of Pittsburgh, in the county of Allegheny and State of Pennsylvania, respectively, have invented certain new and useful Improvements in Center-Bearings for Cars; and we do hereby declare the following to be a full, clear, and exact description of the invention, such as will enable others skilled in the art to which it appertains to make and use the same.

Our invention relates to an improvement in center bearings for cars, the object being to provide a bearing that will operate with less friction and wear than ordinary flat bearings provide for universal swiveling of truck, and one that will greatly simplify and cheapen the construction of the ball center bearings as now used, and reduce vibration and swaying movement of the car body to a minimum.

With these and other objects in view our invention consists in the parts and combination of parts as will be more fully explained and pointed out in the claims.

In the accompanying drawings, Figure 1 is a view in elevation of our improved bearing; Fig. 2 is a view in vertical section of same; Fig. 3 is a plan view and Fig. 4 is a view in section of a modified construction.

1 represents the upper member and 2 the lower member of our improved center bearing, the former of which is provided with a base plate 3 having bolt holes therein for its attachment to the body bolster of a car, and the latter with a base plate 4 having bolt holes for its attachment to the truck bolster.

The lower member 2 is provided centrally with an upwardly projecting circular flange 5 flared outwardly at its upper portion from approximately midway its height, and provided at its upper edge with a continuous groove which forms a seat for a felt dust packing strip 6. Located within the chamber formed by the flange 5, is the bearing block 7 preferably of bell metal. This block is preferably prevented from any turning movement within said chamber, and is provided in its upper face with a concave seat conforming in shape and size to a segment of the hardened steel ball or sphere 8 which latter is loosely seated in the concavity of the bearing block 7.

The upper member of the center bearing is provided with a depending flange 8, also circular in form and of slightly greater internal diameter than the enlarged portion of flange 5 on the lower member, and when the parts are assembled, this flange 8 encircles the flange 5, as clearly shown in Fig. 2, and absolutely prevents a lateral separation of the two members. The upper member is also provided with a depending flange 9, which is within and concentric with the flange 8, and forms with said flange 8, an annular recess in which the upper end of flange 5 rests. The circular flange 9, forms a recessed seat for the bearing block 10, similar in all respects to the bearing block 7 in the lower member of the center bearing.

Seated in the concavity in the lower block 7 is the hardened ball or sphere 11, which supports the upper block 10, and the upper member 1 of the center bearing carried by said block, and forms the sole support for the body bolster and the parts carried by the latter. This sphere has a universal turning movement in the block 7 and also in the block 10, and the latter has a universal turning movement on the sphere.

When the parts are thus assembled, the felt strip 6 will be compressed more or less by its contact with the upper member 1 of the bearing, and operates to exclude dust and dirt from the chamber or housing carrying the ball or sphere, and also prevents the escape of the heavy viscous lubricating oil with which the chamber formed by the flange 6, is partly filled, and in which the ball or sphere 11 is wholly or partly submerged.

Ample clearance between the two parts of the center bearing is provided for the necessary relative movements of the car body and truck, and separation of the two members of the center bearing, in the event of derailment or some accident which would be liable to cause the car body to leave the truck, may be prevented by one or more bolts carried by the flange 8 below the plane of the shoulder 12 on flange 5, as shown in dotted lines in Fig. 2, or I may use a spring metal lock as shown in Figs. 2 and 3. This lock consists simply of a steel rod 13 bent as shown and compressed around the smallest diameter of flange 5 and then raised into position between flanges 5 and 8 and permitted to expand in the annular groove formed in flange 8, the flange 8, being cut away to permit the bent ends 14 of the rod to project sufficiently to be grasped. When in position it underlies the shoulder 12 of flange 5 sufficiently to prevent separation of the parts.

We do not limit our claims, however to the spring locking device herein shown and described, as various devices may be used for holding the parts against separation in the event of derailment or other accident tending to separate the car body and truck.

By employing a spherical center bearing loosely mounted on a seat in the bolster, and mounting the body bolster loosely on the top of the sphere, the truck will be free to turn against the underside of the sphere without transmitting its movement to the car body, the connection being so sensitive that the truck can follow any irregularities in the track and recover itself without necessarily transmitting any of its movement to the car body. The reduced friction minimizes flange wear on wheels. Again, by the use of a ball loosely seated on a bearing block, and supporting the center bearing member on the bolster, friction is reduced to a minimum. The single ball also takes care of the vertical curvature of the track, as well as any motion due to the side bearings on the car body standing apart from the side bearings on the truck bolster.

The construction shown in Fig. 4 is substantially identical with that described in Fig. 2, except that the center of the lower member 2ª of the bearing is depressed as at 2ᵇ, thus considerably lowering the ball and reducing the height from the top of the truck bolster to the lower face of the body bolster.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. The combination of upper and lower members of a center bearing each having a limited rocking movement independently of the other, the lower member having a circular flange, and the upper member having two circular flanges, one depending within the circular flange of the lower member and the other depending outside of the latter, a concave bearing carried by each member and centrally disposed with relation to said flanges, and a sphere mounted in said concave bearings and supporting the upper member, the top of said sphere being in a plane below the top of the flange of the lower member.

2. The combination of two members of a center bearing, each adapted to have a limited rocking movement independently of the other and each having a circular flange, the flange of one member concentric with and overhanging the flange on the other member, a flexible packing strip carried by the flange on the lower member and bearing against the lower face of the upper member, a bearing block in each member and central with relation to said flanges, each block having a concave face, and a ball resting in the concave face of the lower block and supporting the block in the upper member of the bearing.

3. The combination of two members each adapted to have a limited rocking movement independently of the other, and each having a circular flange, the outer flange overlapping an inner flange, means carried by said outer flange and normally resting in the path of a part of the inner flange for preventing accidental separation of said members, a block carried by each member, each block being centrally disposed with relation to the flange, and each having a concave seat, and a hard metal ball resting on the concave seat in one block and supporting the other block.

4. A center bearing for cars consisting of upper and lower members each having a circular flange, the two flanges being concentric, the flange on the lower member carrying means engaging the upper member for excluding dust and the flange on the upper member terminating in a plane below the top of the flange of the lower member, a concave seat on each member and central with relation to said flanges, a hard metal sphere loosely supported on the concave seat on the lower member and supporting the upper member, and means carried by the flange of the outer member and located in a plane below a part of the inner flange for preventing accidental separation of the parts.

5. A center bearing for cars consisting of an upper member and a lower member, each having a circular flange, the flange on the upper member embracing the flange on the lower member and projecting below the upper edge of the latter so as to shed water, means intermediate the two members and within the outer flange for excluding dust, each of said members having a concave seat located centrally with relation to the flanges and a sphere loosely supported in the concave seat of the lower member and loosely supporting the concave seat of the upper member.

6. A center bearing for cars composed of two members formed to shed water, the lower member having a cup-shaped recess for a spherical member and for holding a lubricant in which said spherical member is submerged, the other member being loosely supported for universal movement on said spherical member and means for locking the two members against accidental separation.

In testimony whereof, we have signed this specification in the presence of two subscribing witnesses.

THOMAS ELLIOTT.
WILLIAM E. MOORE.

Witnesses:
WILLIAM L. PAINE,
A. L. KASEMEIER.